United States Patent [19]
Hilton

[11] 4,277,206
[45] Jul. 7, 1981

[54] ADJUSTABLE CHIP BREAKER FOR A CUTTING TOOL

[76] Inventor: Edward W. Hilton, 830 N., Centralia, Wash. 98531

[21] Appl. No.: 98,674

[22] Filed: Nov. 29, 1979

[51] Int. Cl.³ .............................................. B23B 27/22
[52] U.S. Cl. ........................................ 407/3; 407/5; 82/34 R
[58] Field of Search .................. 407/2, 3, 4, 5, 6, 100, 407/117; 82/DIG. 2, 34 R

[56] References Cited

U.S. PATENT DOCUMENTS

| | | | |
|---|---|---|---|
| 2,166,826 | 7/1939 | Shepherd | 407/86 |
| 2,457,469 | 12/1948 | Hillman | 407/6 |
| 2,808,638 | 10/1957 | Filippi | 407/2 |
| 4,041,812 | 8/1977 | Jioio et al. | 142/56 |

Primary Examiner—Leonidas Vlachos
Attorney, Agent, or Firm—Thomas W. Secrest

[57] ABSTRACT

This invention is directed to an adjustable chip breaker associated with a cutting tool having a cutting bit. The position of the chip breaker can be adjusted with respect to the cutting tool.

8 Claims, 6 Drawing Figures

U.S. Patent
Jul. 7, 1981
4,277,206
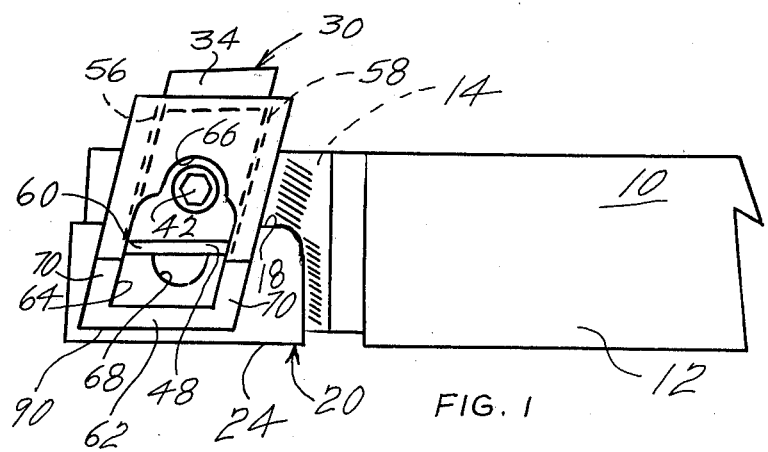
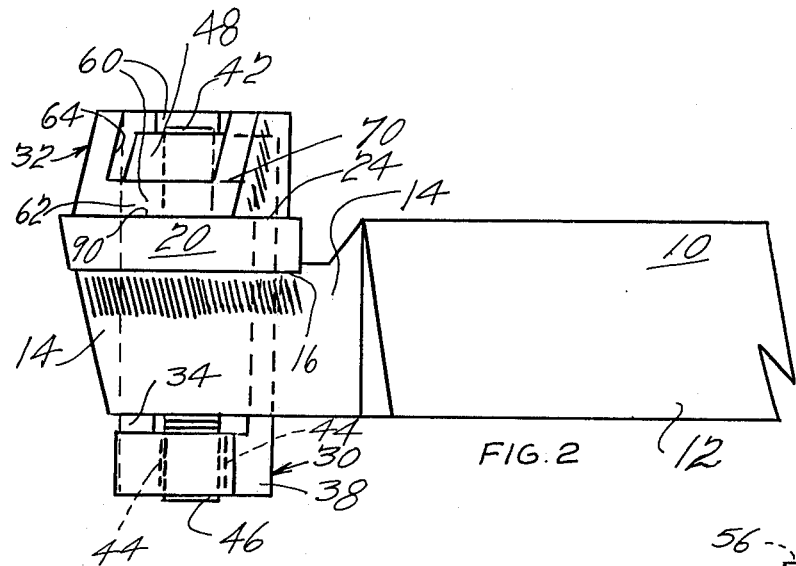
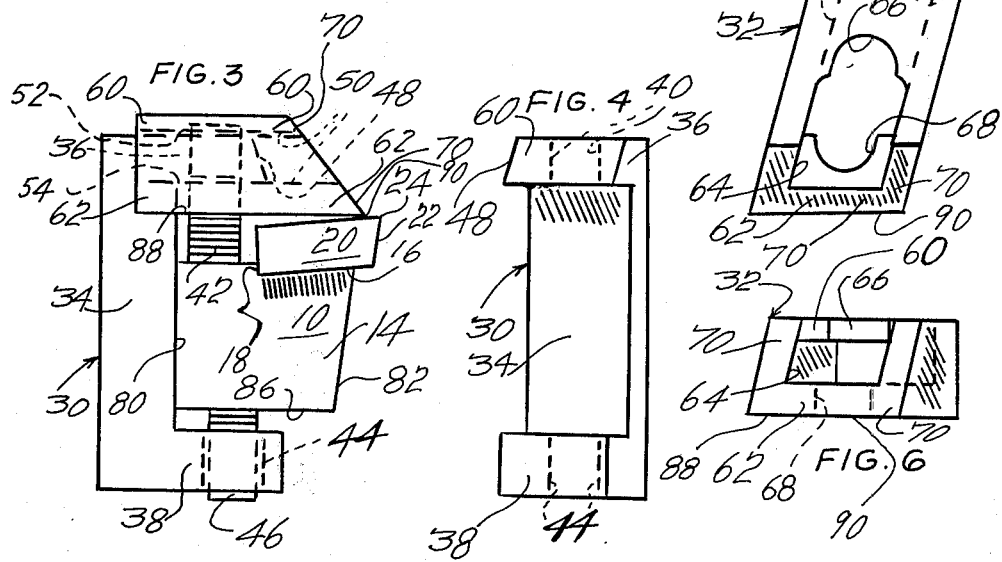

ADJUSTABLE CHIP BREAKER FOR A CUTTING TOOL

A BRIEF DESCRIPTION OF THE INVENTION

A cutting tool for shaping and cutting metal quite often produces long rolls or coils of metal.

It is desirable to reduce the size of these coils or rolls of metal. Quite often, there is employed a chip breaker to break the coils or rolls of metal into short pieces.

This invention is for an adjustable chip breaker. The adjustable chip breaker can assume various positions on the cutting tool. With these various positions the adjustable chip breaker can break the coil into various lengths or sizes of pieces of coil. Further, the adjustable chip breaker makes it possible to account for the wearing and the grinding of the cutting bit. With this adjustable chip breaker the decrease in the size of the cutting bit can be adjusted with the chip breaker so as to have a, substantially, uniform piece or bit of the metal from the article being worked.

THE DRAWING

FIG. 1 is a plan elevational view illustrating the cutting tool, the cutting bit on the cutting tool and the chip breaker;

FIG. 2 is a side view illustrating the cutting tool, the cutting bit and the chip breaker;

FIG. 3 is an end elevational view of a cutting tool, the cutting bit and the adjustable chip breaker;

FIG. 4 is a front view of the yoke and shows a slot for receiving and positioning the breaking member;

FIG. 5 is a plan view of the breaking member alone; and

FIG. 6 is an inside view of the breaking member and illustrates the slot in the breaking member.

THE SPECIFIC DESCRIPTION OF THE INVENTION

A cutting tool for metal working comprising a shank, a head portion and a cutting bit. The work piece is rotated in a chuck. The cutting bit contacts the work piece and part of the work piece is removed as rolls or coils of metal. Sometimes, the roll or coil of metal may be a long tight curl and will not break and may become a hundred yards in length and is known as a bird's nest. Unfortunately, this long tight curl is in the work area and becomes entangled with the chuck holding the work piece and also becomes entangled with the lead screw on the lathe and the cutting tool. Such a coil of metal decreases the useful life of the cutting tool. Some lathe operators grind a groove into the top of the cutting bit so as to form a chip breaker in the cutting bit. The time required to grind the grove into the cutting bit decreases the useful time of the lathe operator and therefore decreases his productive time and increases the cost of the lathe operator. Further, with the grinding of a groove into the cutting bit to form a chip breaker the cutting bit must be discarded or thrown away before its normal useful life has been reached which means an increase in the cost of the cutting bits. Further, if the lathe operator must stop the lathe and remove the coil or roll of metal from the vicinity of the work piece and the cutting tool, there is a loss in production of the lathe operator and therefore an increase in the cost of production of the work piece. Also, if there be a roll or coil of metal, the work area for the lathe operator is less safe than if the metal is broken into chips. A side effect of breaking the metal, from the work piece, into chips is a better finish on the completed work piece as the metal does not work in between the cutting edge of the cutting bit and the work piece. Further, if the metal removed from the work piece is one continuous coil, the metal is not useful for being recycled and melted in a furnace. For example, one barrel of broken chips from the metallic work piece is equal in weight to about twenty to thirty barrels of unbroken chips. It is easier to bail one barrel of broken chips than it is to bail twenty to thirty barrels of unbroken chips. In a melting furnace the temperature is in the range of thirty-two hundred to thirty-three hundred degrees farhenheit (3200°–3300°). If the chips are not bailed, the chips burn and vaporize and the metal is lost. Therefore, it is necessary to bail the chips.

With this invention it is possible to adjust the chip breaker for automatically breaking into chips, the roll or coil of wire from the work piece. Also, it is possible to use this chip breaker with cutting tools of different widths and different heights.

In the drawings it is seen that there is a cutting tool 10 having shank 12 and a head portion 14. The head portion is reduced in cross sectional size compared to the shank 12.

It is seen that one face of the head portion 14 is recessed at 16 and also recessed at 18 to receive a cutting bit 20. The cutting bit is of a generally rectangular configuration having a sloping face 22. The sloping face 22 slopes upwardly and away from the head portion 14. At the junction of the upwardly sloping face 22 and the outer surface of the cutting bit 20 there is a cutting edge 24. It is seen that the cutting edge 24 is positioned above and away from the head portion 14 so as to make it possible for the cutting edge 24 to contact the work piece.

The reader is to realize that the cutting bit 20 is brazed to the head portion 14. In this manner the cutting bit 20 and the cutting tool 10 are integral.

The adjustable chip breaker comprises a yoke 30 and a breaking member 32.

The yoke 30 comprises a base 34, a first arm 36 and a second arm 38. In FIG. 3 it is seen that the base 34 and the two arms 36 and 38 appear, in an end view, to be in a U-configuration.

The first arm 36 has a threaded tapped passageway 40.

A set screw 42 may be screwed into the threaded tapped passageway 40 so as to bear against a side of the head portion 14.

The second arm 38 has a tapped threaded passageway 44. A set screw 46 is screwed into the tapped threaded passageway 44 so as to bear against the head portion 14. In FIG. 3 it is seen that the set screws 42 and 44 bear against opposite surfaces of the head portion 14.

It is seen, see FIG. 3, that the first arm has an upwardly sloping surface 48 going from the outside surface to the inner surface. Also, see FIG. 2, it is seen that the second arm 38 is larger than the first arm 36, both with respect to width of the arm, FIG. 2, and thickness of the arm, FIG. 3.

Further, it is seen in FIGS. 1 and 2 that the arms 36 and 38 are at a slant or a bias. The arms 36 and 38, with respect to the base 34. In other words, the arms 36 and 38 in going upwardly from the base 34 project away from the shank 12 of the cutting tool 10.

The breaking member 32 comprises a block having a through passageway 50. The breaking member 32 has a through passageway 50 along the longitudinal axis.

The through passageway 50 has inner spaced apart side surfaces 52 and 54, which face each other. Also, the passageway 50 has inner end surfaces 56 and 58 which face each other.

There is an outer side wall 60 and an inner side wall 62, on each side of the through passageway 50. In FIG. 3 it is seen that the outer side wall 60 is shorter or less in length than the inner side wall 62.

In the upper part of the outer side wall 60 there is an opening 64. The opening 64 is of a generally rectangular configuration although in the lower part there is a circular portion 66. With the first arm 36 positioned in the through passageway 50 of the breaking member 32 it is possible to see, see FIG. 1, the upper part of the first arm 36 and also the sloping surface 48 of the first arm 36, through the opening 64 and the breaking member 32.

In FIG. 1 it is seen that there is a slot 68 in the inner side wall 62. In FIG. 1 it is possible to see the upper part of the slot 68 in the inner side wall 62, through the opening 64 in the outer side wall 60.

In FIGS. 2 and 3 it is seen that the breaking member 32 has sloping surfaces 70. The sloping surfaces 70 slope downwardly in going from the inner surface of the inner side wall 62 to the outer surface of the outer side wall 60 of the breaking member.

In use, the two set screws 42 and 46 may be loosened and the yoke 30 positioned on the head portion 14 of the cutting tool 10. The yoke 30 is so positioned that the base 34 is on the side of the head portion 14. Also, the yoke 30 is so positioned that the first arm 36 is near the cutting bit 20 and the second arm 38 is on the bottom of the head portion 14. The breaking member 32 can be positioned over the first arm 36 with the first arm 36 being in the through passageway 50.

After the yoke 30 has been adjusted with the head portion 14 and the breaking member 32 has been adjusted with respect to the cutting bit 20 the set screws 42 and 46 can be tightened so as to bear against opposite surfaces of the head portion 14. In FIG. 3 it is seen that the breaking member 32 and the sloping surface 70 of the breaking member 32 are juxtapositioned to the cutting bit 20 or in contact with the cutting bit 20. With the cutting edge 24 bearing against the work piece and a roll or coil of wire coming off of the work piece the roll or coil of wire contacts the breaking member 32 so as to break into small pieces or small bits and fall to the floor. The small pieces or small bits on the floor may be readily removed from the working area by sweeping or vacuuming or any other appropriate means.

The head portion 14, see FIG. 3, has a bottom hidden surface 80, a sloping outer surface 82, a longer side 84 and a shorter side 86.

The breaking member 32 has a long inner side 88. At the junction of the sloping side 70 and the long inner side 88 there is an edge 90.

In FIG. 3 it is seen that the cutting bit 20 is canted and not parallel to the breaking member 32. The edge 90 bears against the upper part of the cutting bit 20. As a result the edge 90 can be considered to bear against the upper part of the longer side 84 of the head portion 14. The set screw 42 bears against the inner surface, viz., near the bottom hidden surface 80, of the longer side 84. In effect, see FIG. 3, the edge 90 bears against one end of the longer side 84 and the set screw 42 bears against the other end of the longer side 84.

The set screw 46 bears against the middle part of the shorter side 86. Or, in other words, the set screw 46 is positioned, with respect to the head portion 14, between the edge 90 and the set screw 42 so that the set screw 46 brings pressure against the edge 90 and the set screw 42 by bearing against the head portion 14. This arrangement of the edge 90 and the set screws 42 and 46 is necessary to position the yoke 30 and the breaking member 32 with respect to the head portion 14. The position of the set screw 46 is necessary to preclude pivoting of the head portion 14 around the edge 90 or the set screw 42.

In preparing this patent application a patent search was not made. However, I do know of four patents relating to chip breakers and deflectors. These patents are:

| PATENTEE | U.S. PAT. NO. |
|---|---|
| Shepherd | 2 166 826 |
| Hillman | 2 457 469 |
| Filippi | 2 808 638 |
| Jioio | 4 041 812 |

Shepherd shows a chip breaker but it is different than the chip breaker of the applicant. Shepherd's chip breaker is over the top of the cutting tool while the applicant's chip breaker is at the side. Hillman shows a chipping roller 18 which is different than the applicant's chip breaker. Filippi shows a chip breaker 20 which is positioned on top of the cutting tool. I have a chip breaker which is partly on top and partly underneath and partly on the side of the head portion which positions the cutting tool as taught by the applicant. Jioio shows a deflector for deflecting chips and the like and which is positioned on top of the cutting tool. These chip breakers pertain to a cutting tool in which the cutting member is loose and not brazed to the shank. They are known as a insert or throwaway type of cutting member. The chip breaker is the clamp that holds the cutting member in place.

As contrasted with these patentees and their inventions having a throwaway and insertable cutting bit 20 the applicant teaches of a cutting bit brazed to the cutting tool. A throw away cutting bit is not sharpened while the cutting bit of the applicant can be sharpended.

The applicant considers that none of these references disclose a chip breaker similar to the applicant's chip breaker. The applicant considers that his chip breaker is not obvious in view of these four references. Further, the applicant does not know of any other chip breaker which is similar to the applicant's chip breaker. Quite often, a machine operator will grind a groove into the top surface of a cutting tool, with varied success as to the chip breaking ability of this groove, so as to try and break the coils or unbroken turnings from the cutting tool and the lathe. In grinding the groove into the top surface of the cutting tool the life of the cutting tool is shortened. A cutting tool is, normally expensive. Further the machine operator in grinding the groove in the top surface of the cutting bit is taking valuable production time to try and make a chip breaker.

It is to be realized that in the case of boring mills chips become entangled on the boring bar, thereby causing deflection of the bar and resulting in an inaccurately bored hole, and, at times, a ruined or spoiled product. Therefore, at times there should be used with the boring tool a chip breaker.

I consider my invention to be new and useful as it is the only chip breaker I know which is adjustable for cutting tools having a different width and different heighth. My chip breaker can be used with different size cutting tools for breaking the coils or unbroken turnings from a lathe and a part being worked or machined. My adjustable chip breaker breaks these coils or turnings of unbroken metal into blanks of about one-eighth inch long to one-half inch long. The bits or pieces of metal, of this size, can be readily collected and compressed so as to be reprocessed in a metal furnace.

From the foregoing and having presented by invention, I claim:

1. A chip breaker for a cutting tool, said chip breaker comprising;
   a. a yoke having a base, a first arm and a second arm;
   b. in an end view said yoke presenting the configuration of a U-member;
   c. said first arm having a first adjusting means to assist in positioning said yoke;
   d. a breaking member;
   e. means to permit said breaking member and said first arm to move relative to each other;
   f. said second arm having a second adjusting means to assist in positioning said yoke.

2. A chip breaker according to claim 1 and comprising:
   a. said means to permit said breaking member and said first arm to move relative to each other comprising a passageway to allow said relative movement; and,
   b. a means to position said first arm and said breaking member with respect to each other.

3. A chip breaker according to claim 1 and comprising:
   a. said means to permit said breaking member and said first arm to move relative to each other comprising a passageway in said breaking member;
   b. said passageway in said breaking member defining an inner side wall;
   c. a slot in said inner side wall; and,
   d. a means to position said breaking member with respect to said first arm.

4. A chip breaker according to claim 1 and comprising:
   a. said means to permit said breaking member and said first arm to move relative to each other comprising a passageway in said breaking member;
   b. said passageway in said breaking member defining an inner side wall;
   c. a slot in said inner side wall; and,
   d. said first arm member comprising a tapped passageway in said first arm, and a set screw in said tapped passageway and in said slot; and,
   e. said second adjusting means comprising a tapped passageway in said second arm and a set screw in said tapped passageway.

5. A combination of a cutting tool and a chip breaker:
   a. said cutting tool comprising:
      1. a shank;
      2. a head portion; and,
      3. a cutting bit positioned on said head portion;
   b. said chip breaker comprising:
      4. a yoke having a base, a first arm and a second arm;
      5. in an end view said yoke presenting the configuration of a U-member;
      6. said first arm having a first adjusting means to assist in positioning said yoke on said cutting tool juxtapositioned to said cutting bit;
      7. a breaking member;
      8. means to permit said breaking member and said first arm to move relative to each other;
      9. said second arm having a second adjusting means to assist in positioning said yoke on second cutting tool.

6. A combination of a cutting tool and a chip breaker according to claim 5 and comprising:
   a. said means to permit said breaking member and said first arm to move relative to each other comprising a passageway to allow said relative movement; and,
   b. a means to position said first arm and said breaking member with respect to each other.

7. A combination of a cutting tool and a chip breaker according to claim 5 and comprising:
   a. said means to permit said breaking member and said first arm to move relative to each other comprising a passageway in said breaking member;
   b. said passageway in said breaking member defining an inner side wall;
   c. a slot in said inner side wall; and,
   d. a means to position said breaking member with respect to said first arm.

8. A combination of a cutting tool and a chip breaker according to claim 5 and comprising:
   a. said means to permit said breaking member and said first arm to move relative to each other comprising a passageway in said breaking member;
   b. said passageway in said breaking member defining an inner side wall;
   c. a slot in said inner side wall; and,
   d. said first arm member comprising a tapped passageway in said first arm and a set screw in said tapped passageway and in said slot; and,
   e. said second adjusting means comprising a tapped passageway in said second arm and a set screw in said tapped passageway.

* * * * *